United States Patent
Ogawa et al.

[11] Patent Number: 5,914,061
[45] Date of Patent: Jun. 22, 1999

[54] HIGH NITROGEN FLUX CORED WIRE FOR ALL POSITION WELDING OF CR-NI TYPE STAINLESS STEEL

[75] Inventors: Tsuneshi Ogawa; Toshiharu Maruyama; Shigeki Nishiyama; Shintaro Ozaki, all of Fujisawa, Japan

[73] Assignee: Kabushiki Kaisha Kobe Seiko Sho, Kobe, Japan

[21] Appl. No.: 08/743,532

[22] Filed: Nov. 4, 1996

[30] Foreign Application Priority Data

Nov. 7, 1995 [JP] Japan ................................. 7-289022

[51] Int. Cl.$^6$ ................................................. B23K 35/22
[52] U.S. Cl. ........................................................... 219/145.22
[58] Field of Search ................................. 219/137 WM, 219/145.22, 146.23

[56] References Cited

U.S. PATENT DOCUMENTS

| | | | |
|---|---|---|---|
| 3,716,691 | 2/1973 | Baybrook et al. | 219/137 WM |
| 5,124,529 | 6/1992 | Nishikawa et al. | |
| 5,219,425 | 6/1993 | Nishikawa et al. | 219/145.22 |
| 5,378,871 | 1/1995 | Nishikawa et al. | |

FOREIGN PATENT DOCUMENTS

| | | |
|---|---|---|
| 3-42195 | 2/1991 | Japan . |
| 3-264194 | 11/1991 | Japan . |

*Primary Examiner*—Clifford C. Shaw
*Attorney, Agent, or Firm*—Oblon, Spivak, McClelland, Maier & Neustadt, P.C.

[57] ABSTRACT

A high nitrogen flux cored wire contains N and nitrogen compound (total converted value of N): 0.05 to 0.30 wt %, with respect to total weight of the wire, in stainless steel sheath and flux, and $TiO_2$: 4.0 to 8.0 wt %; $ZrO_2$: 0.5 to 4.0 wt %; $SiO_2$: 0.05 to 1.5 wt %; $Al_2O_3$: 0.05 to 1.5 wt %; metal fluoride (converted value of F): 0.02 to 0.7 wt %; and metal carbonate: less than or equal to 1.0 wt %; a content of $Al_2O_3$ and $SiO_2$ in total being restricted to be less than or equal to 2.5 wt %, with respect to total weight of the wire, in the flux. Since an appropriate amount of nitrogen is contained in the wire, superior corrosion resistance of the welded metal can be obtained. Also, since an appropriate amounts of the slag forming agent, alloying component and so forth are contained, it becomes possible to achieve high welding workability in all position welding.

13 Claims, 1 Drawing Sheet

HIGH NITROGEN FLUX CORED WIRE FOR ALL POSITION WELDING OF CR-NI TYPE STAINLESS STEEL

BACKGROUND OF THE INVENTION

1. Field of the Invention

The present invention relates to a high nitrogen flux cored wire for all position welding of Cr—Ni type stainless steel, which is used for welding of Cr—Ni type stainless steel, superior in corrosion resistance of welded metal and can improve workability in welding at all position.

2. Description of the Related Art

Stainless steel having high nitrogen content, such as SUS304N2 and SUS329J3L and so forth, has high corrosion resistance and high strength. Therefore, it has been widely applied as strength member in construction, structural member of various tanks, water gates and so forth.

In welding of these members, a welding material which has similar composition to a base material is basically and frequently used. A large number of kinds of steels of wires are present similarly to the base metal. On the other hand, as welding method of these, various methods have been applied. Particularly, welding by means of flux cored wire has been widely employed.

In the recent years, concerning the flux cored wire for welding of high nitrogen Cr—Ni type stainless steel applied for welding of the base metal of high nitrogen content, improvement of workability in welding has been demanded similarly to the flux cored wire with low nitrogen content particularly, when there is a constraint in configuration of the member, jig or so forth or when a structural member is to be constructed by welding, good workability in vertical position welding and overhead position welding becomes necessary because all position welding is required for welding of those members. Namely, in concrete, development of flux cored wire achieving superior arc stability, slag removing characteristics, bead shape and slag coverage, has been highly desired.

Therefore, high nitrogen flux cored wire for welding of stainless steel which can improve welding workability in vertical position welding by restricting content of specific compound in the flux at an appropriate amount, has been proposed (Japanese Unexamined Patent Publication (Kokai) No. Heisei 3 (1991)-264194).

However, when nitrogen content in the wire becomes high, slag removing characteristics can be lowered and the bead shape in the overhead position welding may be degraded. On the other hand, a welding current applicable for the vertical position welding is limited in the extent of 120A to make allowable welding condition quite narrow. Therefore, when welding is performed for construction, in practice, application of the wire is limited and skillful welding becomes necessary. Accordingly, development of high nitrogen stainless steel flux cored wire for all position welding, which can widen applicable range of current, achieve good workability, and improve working efficiency has been strongly demanded.

On the other hand, a flux cored wire for welding of Cr type stainless achieving good welding workability and improvement in anti-cracking property and toughness, has been proposed (Japanese Unexamined Patent Publication No. Heisei 3(1991)-42195. However, in such wire, the nitrogen content in the wire is in the range of 0.02 to 0.06 wt %, and thus is not applicable for welding of high nitrogen Cr—Ni type stainless steel.

SUMMARY OF THE INVENTION

Therefore, it is an object of the present invention to provide a high nitrogen flux cored wire for all position welding of Cr—Ni type stainless steel, which can achieve high corrosion resistance of the welded metal and provide good welding workability in all position.

According to one aspect of the invention, high nitrogen flux cored wire for all position welding of Cr—Ni type stainless steel, formed by filling a flux into a stainless steel sheath, contains:

N and nitrogen compound (total converted value of N): 0.05 to 0.30 wt % with respect to total weight of the wire, in the sheath and the flux; and $TiO_2$: 4.0 to 8.0 wt %; $ZrO_2$: 0.5 to 4.0 wt %; $SiO_2$: 0.05 to 1.5 wt %; $Al_2O_3$: 0.05 to 1.5 wt %; Metal fluoride (converted value of F): 0.02 to 0.7 wt %; and Metal carbonate: less than or equal to 1.0 wt %; a content of $Al_2O_3$ and $SiO_2$ in total being restricted to be less than or equal to 2.5 wt % with respect to total weight of the wire, in the flux.

According to another aspect of the invention, a high nitrogen flux cored wire for all position welding of Cr—Ni type stainless steel, formed by filling a flux within a stainless steel sheath, contains:

N and nitrogen compound (total converted value of N): 0.05 to 0.30 wt %, with respect to total weight of the wire, in the sheath and the flux;

$TiO_2$: 4.0 to 8.0 wt %; $ZrO_2$: 0.5 to 4.0 wt %; $SiO_2$: 0.05 to 1.5 wt %; $Al_2O_3$: 0.05 to 1.5 wt %; and Metal fluoride (converted value of F): 0.02 to 0.7 wt %; a content of $Al_2O_3$ and $SiO_2$ in total being restricted to be less than or equal to 2.5 wt %, and metal carbonate as an impurity being restricted to be less than or equal to 1.0 wt %, with respect to total weight of the wire, in the flux.

Preferably, assuming that contents of $ZrO_2$, $Al_2O_3$ and $SiO_2$ in the sheath and the flux relative to the total amount of the wire are respectively $[ZrO_2]$, $[Al_2O_3]$ and $[SiO_2]$, a value A derived through an equation $(A=([ZrO_2]+[Al_2O_3])/[SiO_2])$ is greater than or equal to 0.7.

Also, it is preferred that a total amount of contents of Nb and V with respect to the total weight of the wire in the sheath and flux is restricted to be less than 0.3 wt %, and assuming converted value of F and converted value of N, and contents of Nb and V with respect to total weight of the wire are respectively [F], [N], [Nb] and [V], a value calculated from $([F]/([N]+3\times([Nb]+[V])))$ is greater than or equal to 0.2.

The inventors made various study for correlation between the chemical composition of the wire and welding workability, such as arc stability, spatter generation amount, slag coverage, slag removing characteristics, bead shape and so forth, in the flux cored wire for welding Cr—Ni type stainless steel having high nitrogen content. Various study have also been made through experiments about association between the wire composition and welding defect, such as slag inclusion, blow hole and so forth.

As a result, it has been found that slag removing characteristics in vertical position and overhead position welding can be improved by restricting the content of $TiO_2$ and reducing the contents of $SiO_2$ and $Al_2O_3$. However, when $Al_2O_3$ content is reduced, in vertical position and overhead position welding, slag may flow easily to cause degradation of a bead shape to significantly narrow an applicable range of welding current in respective positions. Thus, the desired wire cannot be obtained only by reducing the $Al_2O_3$ content.

Therefore, the inventors have perform studies and experiments for flux composition, in which good slag removing characteristics and good bead shape can be obtained at a wide range of welding current in vertical and overhead position welding by Cr—Ni type flux cored wire of high nitrogen content. As a result, it has been found that good welding workability can be obtained by increasing $ZrO_2$ content and restricting $SiO_2$ and $Al_2O_3$ contents. On the other hand, slag removing characteristics are affected by individual contents of $SiO_2$ and $Al_2O_3$ and total amount thereof. Accordingly, in the present invention, it becomes necessary to restrict total amount of $SiO_2$ and $Al_2O_3$.

Furthermore, by appropriately restricting a value derived by contents of $ZrO_2$, $Al_2O_3$ and $SiO_2$ in the flux, superior bead shape and slag removing characteristics can be obtained even in vertical straight-up welding which has been difficult to obtain good workability in the prior art.

Hereinafter, chemical composition contained in the high nitrogen flux cored wire for all position welding of Cr—Ni type stainless steel, and reason of limitation of the composition in the present invention will be discussed.

N and Nitrogen Compound (Converted value of N): 0.05 to 0.30 wt %

Nitrogen is solid solution enhancement element, and has effect for increasing strength of the welded metal and for improving pitting corrosion resistance, crevice corrosion resistance and so forth. When the nitrogen content in the wire is less and 0.05 wt %, sufficient effect cannot be obtained. On the other hand, when the nitrogen content exceeds 0.30 wt %, possibility of occurrence of welding defect, such as blow hole and so forth is increased. Also, even when nitrogen content is further increased, effect of improving strength, pitting corrosion resistance, crevice corrosion resistance can be lowered. Accordingly, content of N and nitrogen compound is preferred in a range of 0.05 to 0.30 wt % in converted value of N with respect to total weight of the wire. It should be noted that N is contained in either or both of steel sheath and flux, when N is contained in the flux in a form of nitrogen compound, the foregoing preferred range is applied for total amount as converted into N.

$TiO_2$: 4.0 to 8.0 wt %

$TiO_2$ has effects of improvement of stability of arc, and stabilization of slag covering ability. $TiO_2$ also has an effect for making bead shape good. When $TiO_2$ content is less than 4.0 wt %, sufficient effect can not be obtained. On the other hand, when the content of $TiO_2$ exceeds 8.0 wt % is not desirable for lowering of flow ability of the slag to cause slag inclusion, and hardening of slag to lower slag removing characteristics, conversely. Accordingly, the content of $TiO_2$ with respect to total weight of the wire is preferred to be in a range of 4.0 to 8.0 wt %.

$ZrO_2$: 0.5 to 4.0 wt %

$ZrO_2$ maintains viscosity of slag in good condition in vertical position and overhead position welding, prevents flowing down of the slag and improves bead shape. When content of $ZrO_2$ is less than 0.5 wt %, sufficient effect cannot be obtained. On the other hand, when the content of $ZrO_2$ exceeds 4.0 wt %, viscosity of the slag becomes excessively high to excessively cover a molten pool with the slag, upon welding. Therefore, $ZrO_2$ content in the flux is a range of 0.5 to 4.0 wt % with respect to total weight of the wire.

$SiO_2$: 0.05 to 1.5 wt % $SiO_2$ has an effect to make intimacy of the bead and slag coverage. When the content of $SiO_2$ is less than 0.05 wt %, sufficient effect cannot be obtained. On the other hand, when $SiO_2$ content exceeds 1.5 wt %. viscosity of the slag becomes excessively high to cause degradation of the bead shape, and to significantly lower slag removing characteristics. Accordingly, the content of $SiO_2$ in the flux is 0.05 to 1.5 wt % with respect to total weight of the wire.

$Al_2O_3$: 0.05 to 1.5 wt %

$Al_2O_3$ maintains slag at high melting point, prevents slag from flowing down in vertical position and overhead position welding, and makes the bead shape good. When the content of $Al_2O_3$ is less than 0.05 wt %, sufficient effect cannot be obtained. On the other hand, when the content of $Al_2O_3$ exceeds 1.5 wt %, the shape of the bead can be degraded, and removing characteristics of the slag can be lowered significantly. Also, spatter generating amount is increased. Accordingly, the preferred range of the content of $Al_2O_3$ is 0.05 to 1.5 wt % with respect to the total weight of the wire.

Metal Fluoride (Converted value of F): 0.02 to 0.7 wt %

Metal fluoride has effects for adjusting flow ability of slag and improving slag removing ability. When converted value of F of metal fluoride is less than 0.02 wt %, sufficient effect cannot be obtained. On the other hand, the content of the metal fluoride exceeds 0.7 wt %, slag may easily flow down to make vertical position and overhead position welding difficult. Also, spatter generation amount is significantly increased. Accordingly, the content of the metal fluoride is in a range of 0.02 to 0.7 wt % in converted value of F with respect to total weight of the wire.

$SiO_2+Al_2O_3$: less than or equal to 2.5 wt % in total amount

As set forth above, when $SiO_2$ and $Al_2O_3$ are excessively contained in the flux, slag removing characteristics can be significantly lowered. Therefore, even when the contents of $SiO_2$ and $Al_2O_3$ are within a range defined in the present invention, respectively, if the total amount exceeds 2.5 wt %, slag removing characteristics can be lowered. Accordingly, the contents of $SiO_2$ and $Al_2O_3$ is set to be lower than or equal to 2.5 wt % in the total weight.

Metal carbonate: less than or equal to 1.0 wt %

By adding metal carbonate in the flux, removing characteristics of the slag is lowered and spatter generation amount is significantly increased. Accordingly, the content of metal carbonate is limited to be less than or equal to 1.0 wt % with respect to total weight of the wire.

The present invention is intended to achieve good workability in welding in all position even with using flux cored wire having high nitrogen content, and the composition of the wire is defined as set forth above. However, in vertical straight up welding for relatively narrow bevel, it is difficult to certainly maintain superior slag removing characteristics and arc stability, and to obtain good bead shape. Therefore, for obtaining good bead shape, a ratio of $ZrO_2$ and $Al_2O_3$ versus $SiO_2$ is restricted. Hereinafter, reason of restriction of the ratio will be discussed.

A $(A=([ZrO_2]+[Al_2O_3])/[SiO_2])$: 0.7 or more $ZrO_2$ and $Al_2O_3$ prevents the slag from flowing down, and $SiO_2$ has an effect for adjusting viscosity of the slag. Therefore, when the contents of $ZrO_2$, $Al_2O_3$ and $SiO_2$ with respect to total weight of the wire by weight are assumed to be respectively $[ZrO_2]$, $[Al_2O_3]$ and $[SiO_2]$, a value derived through the equation $(A=([ZrO_2]+[Al_2O_3])/[SiO_2])$ is more than or equal to 0.7, superior welding workability can be certainly maintained, and make the bead shape better. Accordingly, the value A derived from $(A=([ZrO_2]+[Al_2O_3])/[SiO_2])$ is preferred to be more than or equal to 0.7. It should be noted that, in order to obtain smooth and good intimacy, value A is further preferred to be more than or equal to 2.5.

Then, by restricting impurity component and so forth in the wire, slag removing characteristics can be further improved. Hereinafter, the impurity components which are inevitably contained in the wire and the reason of limitation for respective impurity components will be discussed.

(Nb+V) Content: less than or equal 0.3 wt %

[F]/([N]+3×([Nb]+[V])): 0.2 or more

Nb and V as impurity in the wire significantly influences for slag removing ability. On the other hand, in the high nitrogen flux cored wire, the slag removing characteristics can be lowered significantly by mutual action of N, Nb and V. In order to suppress lowering of the slag removing characteristics, it is effective to adjust contents of the slag forming agent in the wire. However, when the total amount of Nb and V exceeds 0.3 wt % with respect to total weight of the wire, it becomes difficult to suppress lowering of the slag removing characteristics only by adjusting of the slag forming agent.

On the other hand, assuming that the contents of F, N, Nb and V in the wire with respect to total weight of the wire are respective [F], [N], [Nb] and [V], the value derived through ([F]/([N]+3×([Nb]+[V]))) is more than or equal to 0.2, good slag removing characteristics can be maintained. Accordingly, the content of Nb and V is preferred to be less than or equal to 0.3 wt % in total weight with respect to total weight of the wire, and the value derived from [F]/([N]+3×([Nb]+[V]))) is preferred to be more than or equal to 0.2.

In the present invention, in addition to the components set forth above, various slag forming agent may be added. The kind and amount of the slag forming agent are not specified. For example, in the flux constituting the high nitrogen flux cored wire for welding of stainless steel, there are contained alloying components, such as Ni, Cr and Mo. However, since the contents of these components are differentiated for the kind of steel to be welded, thus the contents of those components are not specified. Also, concerning deoxidation agent, such as Si, Mn, Ti, Al, Mg and Zr, there is not specific values, and thus can be added as required.

Also, as a form of flux cored wire, there is a wire formed by filling the flux within a seamless tube or a stainless steel thin plate formed into a pipe shaped configuration. Variety of cross sectional configuration can be taken in the latter case. However, the present invention is applicable for any form of flux cored wire. Concerning shield gas, any of 100% $CO_2$ gas and mixture gas of Ar and 20% $CO_2$ gas may be applicable.

According to the present invention, since an appropriate amount of nitrogen is contained in the wire, superior corrosion resistance of the welded metal can be obtained. Also, since the present invention defines appropriate amounts of the slag forming agent, alloying component and so forth, it becomes possible to provide high nitrogen flux cored wire for all position welding of Cr—Ni type stainless steel, which achieves high welding workability in all position welding. Also, by appropriately restricting proportion of $ZrO_2$ and $Al_2O_3$ versus $SiO_2$, better bead shape can be obtained. Furthermore, by restricting contents of impurity in flux cored wire and contents of F and N at appropriate amounts, slag removing characteristics can be improved.

BRIEF DESCRIPTION OF THE DRAWINGS

The present invention will be understood more fully from the detailed description given herebelow and from the accompanying drawings of the preferred embodiment of the invention, which, however, should not be taken to be limitative to the present invention, but are for explanation and understanding only.

In the drawings.

EMBODIMENTS

Hereinafter, examples of high nitrogen flux cored wire for all position welding of Cr—Ni type stainless steel according to the present invention will be discussed concretely with comparison with comparative examples.

At first, with employing steel sheathes of the following table 1, the flux cored wires were prepared. Then, utilizing these flux cored wires, vertical position and overhead position welding were performed for welding base metals having chemical compositions as shown in the following table 2. Then, workability in welding was evaluated. The welding condition at this time is shown in the following table 3.

Figure 1A:
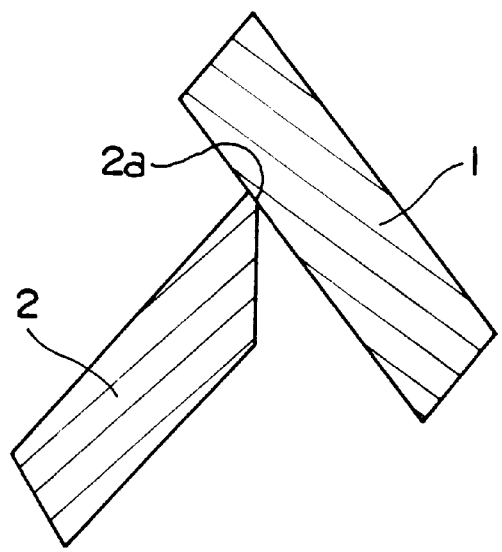
FIG. 1A is a diagrammatic section showing a bevel configuration of a base metal in vertical position welding.
Figure 1B:
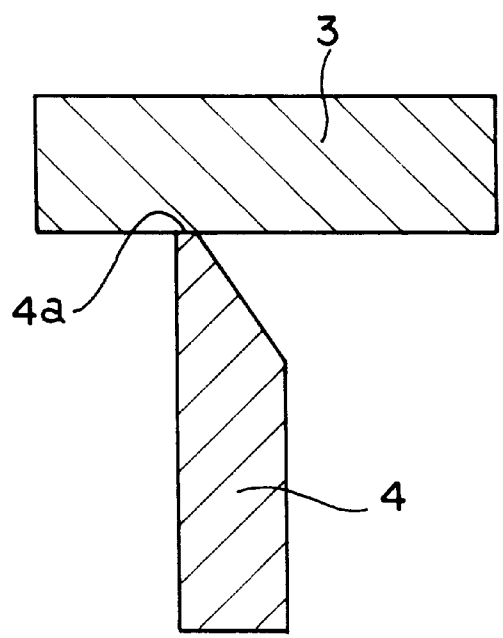
FIG. 1B is a diagrammatic section showing bevel configuration of the base metal in overhead position welding.

FIG. 1A is a diagrammatic section showing a bevel configuration of a base metal in vertical position welding, and FIG. 1B is a diagrammatic section showing bevel configuration of the base metal in overhead position welding. As shown in FIG. 1A, in the vertical position welding, on the side surface of a base metal 1, a base metal 2 having cut-out at one side is arranged to abut onto the side surface of the base metal 1 at the end. In the following examples and the comparative examples, the thicknesses of the base metals 1 and 2 were both 9 mm, the bevel angle formed therebetween was set at 60°. Also, a route length of a route portion 2a of the base metal 2 was 2 mm.

On the other hand, as shown in FIG. 1B, even in the overhead position welding, on the side surface of a base metal 3, a base metal 4 having a cut-out at one side was arranged to abut the end onto the former. The thicknesses of the base metals 3 and 4 are both 12 mm, the bevel angle defined therebetween was 55°. The chemical compositions of respective wires are shown in the following tables 4 to 11. Also, the results of evaluation of workability in welding is show in the following tables, wherein in the columns of evaluation results, ⊚ represents quite good, ○ represents good and x represents no good.

TABLE 1

| SHEATH SIGN | COMPOSITION OF SHEATH (wt %) | | | | | | | | | | | |
| --- | --- | --- | --- | --- | --- | --- | --- | --- | --- | --- | --- | --- |
| | C | Si | Mn | P | S | Cu | Ni | Cr | Mo | V | Nb | N |
| A | 0.015 | 0.44 | 1.02 | 0.023 | 0.006 | 0.03 | 9.80 | 19.41 | 0.02 | tr. | 0.005 | 0.012 |
| B | 0.025 | 0.56 | 1.25 | 0.020 | 0.002 | 0.20 | 10.03 | 19.01 | 0.30 | 0.16 | 0.24 | 0.041 |
| C | 0.016 | 0.36 | 1.15 | 0.022 | 0.005 | 0.08 | 9.95 | 19.68 | 0.01 | 0.02 | 0.10 | 0.025 |

TABLE 2

| BASE METAL SIGN | COMPOSITION OF BASE METAL (wt %) | | | | | | | | | |
|---|---|---|---|---|---|---|---|---|---|---|
| | C | Si | Mn | P | S | Cu | Ni | Cr | Mo | N |
| X | 0.031 | 0.65 | 1.02 | 0.023 | 0.007 | 0.05 | 9.20 | 18.91 | 0.12 | 0.11 |
| Y | 0.025 | 0.56 | 1.18 | 0.021 | 0.003 | 0.10 | 12.03 | 18.41 | 2.51 | 0.13 |
| Z | 0.024 | 0.57 | 0.91 | 0.020 | 0.006 | 0.05 | 6.25 | 22.88 | 2.89 | 0.12 |

TABLE 3

| WELDING POSITION | VERTICAL | | OVERHEAD |
|---|---|---|---|
| WIRE MOVING METHOD | STRAIGHT | WEAVING | STRAIGHT |
| WELDING CURRENT (A) | 150 | 180 | 190 |
| WELDING VOLTAGE (V) | 24 | 26 | 27 |
| POLARITY | DCEP | | |
| SHIELDING GAS | Ar + 20% $CO_2$ 25 litters/minutes | | |

TABLE 4

| No | SHEATH SIGN | BASE METAL SIGN | FLUX RATIO (wt %) | CHEMICAL COMPOSITION OF FLUX (wt %) | | | | | |
|---|---|---|---|---|---|---|---|---|---|
| | | | | $TiO_2$ | $SiO_2$ | $ZrO_2$ | $Al_2O_3$ | $Na_2O$ | $K_2O$ |
| EXAMPLES | | | | | | | | | |
| 1 | A | Z | 25.0 | 6.75 | 0.47 | 2.06 | 0.38 | 0.06 | 0.17 |
| 2 | A | X | 23.0 | 5.31 | 0.21 | 1.74 | 0.18 | 0.08 | 0.21 |
| 3 | C | Y | 25.0 | 5.85 | 0.91 | 2.65 | 0.14 | 0.07 | 0.23 |
| 4 | A | X | 24.0 | 6.96 | 0.16 | 1.02 | 0.91 | 0.13 | 0.20 |
| 5 | A | X | 23.5 | 6.72 | 1.46 | 0.56 | 0.36 | 0.13 | 0.20 |
| 6 | C | X | 25.0 | 4.08 | 1.23 | 3.84 | 0.07 | 0.20 | 0.35 |
| 7 | C | Z | 25.0 | 5.40 | 0.26 | 1.59 | 1.16 | 0.10 | 0.28 |
| 8 | B | Z | 25.0 | 6.78 | 0.31 | 1.97 | 0.25 | 0.10 | 0.22 |
| 9 | A | X | 26.0 | 7.72 | 0.23 | 0.56 | 1.13 | 0.04 | 0.14 |
| 10 | A | Y | 25.0 | 5.98 | 0.36 | 1.00 | 0.25 | 0.06 | 0.08 |
| 11 | A | Y | 24.0 | 6.69 | 1.49 | 0.99 | 0.06 | 0.06 | 0.16 |
| 12 | C | X | 24.5 | 6.77 | 1.03 | 0.60 | 0.89 | 0.06 | 0.16 |
| 13 | C | Z | 25.0 | 6.50 | 0.42 | 2.08 | 0.36 | 0.05 | 0.17 |
| 14 | C | X | 25.5 | 5.10 | 0.95 | 0.61 | 1.45 | 0.15 | 0.28 |
| 15 | C | Z | 25.0 | 7.06 | 0.06 | 1.81 | 0.63 | 0.01 | 0.05 |

TABLE 5

| No | CHEMICAL COMPOSITION OF FLUX (wt %) | | | | | | | Converted Value of F |
|---|---|---|---|---|---|---|---|---|
| | $Li_2CO_3$ | $CaCO_3$ | NaF | $CaF_2$ | $AlF_3$ | $K_2SiF_6$ | $CeF_3$ | |
| 1 | — | — | 0.14 | — | — | 0.15 | 0.13 | 0.18 |
| 2 | — | — | 0.22 | — | — | — | — | 0.10 |
| 3 | — | — | 0.31 | — | — | — | 0.11 | 0.17 |
| 4 | 0.07 | — | 0.23 | — | — | — | — | 0.10 |
| 5 | — | — | 0.04 | — | — | 0.02 | — | 0.03 |
| 6 | — | — | 0.02 | — | — | 0.13 | — | 0.08 |
| 7 | — | — | 0.86 | — | — | 0.50 | 0.11 | 0.68 |
| 8 | — | — | 0.19 | — | — | 0.09 | 0.06 | 0.15 |
| 9 | 0.28 | 0.43 | 0.29 | 0.05 | 0.04 | — | — | 0.18 |
| 10 | 0.16 | — | 0.15 | 0.31 | — | — | 0.25 | 0.29 |
| 11 | — | — | 0.23 | — | — | — | — | 0.10 |
| 12 | 0.59 | 0.32 | 0.23 | — | — | — | — | 0.10 |
| 13 | — | — | 0.15 | — | — | — | 0.25 | 0.14 |
| 14 | — | — | 1.32 | — | — | 0.13 | — | 0.66 |
| 15 | — | — | 0.14 | 0.03 | — | 0.13 | — | 0.15 |

TABLE 6

| | CHEMICAL COMPOSITION OF FLUX (wt %) | | | | $Al_2O_3$ + | A: $(ZrO_2$ + |
|---|---|---|---|---|---|---|
| No | MgO | CaO | MnO | OTHER | $SiO_2$ | $Al_2O_3)/SiO_2$ |
| EXAMPLES | | | | | | |
| 1 | — | — | — | 0.06 | 0.85 | 5.2 |
| 2 | 0.19 | — | — | 0.07 | 0.39 | 9.1 |
| 3 | — | 0.03 | — | 0.05 | 1.05 | 3.1 |
| 4 | — | — | 0.13 | 0.06 | 1.07 | 12.1 |
| 5 | — | — | — | 0.06 | 1.82 | 0.6 |
| 6 | — | — | — | 0.08 | 1.30 | 3.2 |
| 7 | 0.05 | — | — | 0.09 | 1.42 | 10.6 |
| 8 | — | — | — | 0.07 | 0.56 | 7.2 |
| 9 | — | — | — | 0.08 | 1.36 | 7.3 |

TABLE 6-continued

| | CHEMICAL COMPOSITION OF FLUX (wt %) | | | | $Al_2O_3$ + | A: $(ZrO_2$ + |
|---|---|---|---|---|---|---|
| No | MgO | CaO | MnO | OTHER | $SiO_2$ | $Al_2O_3)/SiO_2$ |
| 10 | — | — | — | 0.06 | 0.61 | 3.5 |
| 11 | — | — | 0.07 | 0.06 | 1.55 | 0.7 |
| 12 | — | — | — | 0.08 | 1.92 | 1.4 |
| 13 | — | — | — | 0.08 | 0.78 | 5.8 |
| 14 | — | — | — | 0.08 | 2.40 | 2.2 |
| 15 | — | — | — | 0.06 | 0.69 | 40.7 |

TABLE 7

| | CHEMICAL COMPOSITION OF WIRE (wt %) | | | | | | | |
|---|---|---|---|---|---|---|---|---|
| No | Converted Value of N | V | Nb | V + Nb | Cr | Ni | Mo | F/(N + 3(V + Nb)) |
| EXAMPLES | | | | | | | | |
| 1 | 0.13 | — | — | — | 22.05 | 8.4 | 2.89 | 1.38 |
| 2 | 0.09 | — | — | — | 19.58 | 8.68 | 0.24 | 1.11 |
| 3 | 0.11 | 0.02 | 0.08 | 0.10 | 18.56 | 11.36 | 2.56 | 0.41 |
| 4 | 0.10 | — | — | — | 18.23 | 8.95 | 0.01 | 1.00 |
| 5 | 0.06 | — | — | — | 18.35 | 8.56 | 0.03 | 0.50 |
| 6 | 0.06 | 0.02 | 0.08 | 0.10 | 17.98 | 8.53 | 0.01 | 0.22 |
| 7 | 0.11 | 0.02 | 0.08 | 0.10 | 22.32 | 8.62 | 2.35 | 1.66 |
| 8 | 0.27 | 0.13 | 0.18 | 0.31 | 22.16 | 8.23 | 2.64 | 0.13 |
| 9 | 0.07 | — | — | — | 18.51 | 8.59 | 0.01 | 2.57 |
| 10 | 0.10 | — | — | — | 18.45 | 11.5 | 2.34 | 2.90 |
| 11 | 0.10 | — | — | — | 18.12 | 11.48 | 2.45 | 1.00 |
| 12 | 0.07 | 0.02 | 0.08 | 0.10 | 19.45 | 8.56 | 0.21 | 0.27 |
| 13 | 0.17 | 0.02 | 0.08 | 0.10 | 22.81 | 8.56 | 2.66 | 0.30 |
| 14 | 0.07 | 0.02 | 0.08 | 0.10 | 19.09 | 9.02 | 0.01 | 1.78 |
| 15 | 0.15 | 0.02 | 0.08 | 0.10 | 21.89 | 8.78 | 2.13 | 0.33 |

TABLE 8

| No | SHEATH SIGN | BASE METAL SIGN | FLUX RATIO (wt %) | CHEMICAL COMPOSITION OF FLUX (wt %) | | | | | |
|---|---|---|---|---|---|---|---|---|---|
| | | | | $TiO_2$ | $SiO_2$ | $ZrO_2$ | $Al_2O_3$ | $Na_2O$ | $K_2O$ |
| COMP. | | | | | | | | | |
| 16 | B | X | 24.5 | 8.13 | 0.38 | 0.60 | 0.22 | 0.05 | 0.14 |
| 17 | A | Y | 25.0 | 6.91 | 0.03 | 2.07 | 0.29 | 0.14 | 0.39 |
| 18 | A | X | 25.0 | 3.83 | 1.50 | 2.69 | 1.56 | 0.09 | 0.25 |
| 19 | A | Z | 25.0 | 6.81 | 1.63 | 0.45 | 0.39 | 0.06 | 0.16 |
| 20 | C | X | 24.0 | 5.63 | 0.13 | 3.25 | 0.04 | 0.06 | 0.12 |
| 21 | C | Y | 25.0 | 5.89 | 0.36 | 2.01 | 1.45 | 0.06 | 0.15 |
| 22 | A | Z | 25.0 | 6.28 | 0.61 | 1.56 | 0.25 | 0.11 | 0.22 |
| 23 | B | Z | 25.0 | 4.98 | 0.64 | 4.10 | 0.39 | 0.11 | 0.22 |
| 24 | B | Z | 24.5 | 6.02 | 0.48 | 1.56 | 0.34 | 0.11 | 0.22 |
| 25 | B | Z | 23.5 | 6.13 | 0.47 | 1.72 | 0.33 | 0.13 | 0.22 |

TABLE 9

| | CHEMICAL COMPOSITION OF FLUX (wt %) | | | | | | | |
|---|---|---|---|---|---|---|---|---|
| No | Li₂CO₃ | CaCO₃ | NaF | CaF₂ | AlF₃ | K₂SiF₆ | CeF₃ | Converted Value of F |
| COMP. | | | | | | | | |
| 16 | — | — | 0.14 | — | — | — | 0.07 | 0.08 |
| 17 | — | — | 0.17 | — | — | 0.13 | — | 0.14 |
| 18 | — | — | 0.17 | 0.13 | — | — | — | 0.14 |
| 19 | 0.04 | — | 0.19 | — | 0.05 | 0.08 | — | 0.16 |
| 20 | — | — | 0.56 | — | — | — | 0.12 | 0.29 |
| 21 | — | — | 0.02 | — | — | — | — | 0.01 |
| 22 | — | — | 0.24 | 1.00 | 0.08 | 0.13 | 0.25 | 0.79 |
| 23 | — | 0.23 | 0.24 | — | — | — | — | 0.11 |
| 24 | 0.45 | 0.59 | 0.23 | — | — | — | — | 0.10 |
| 25 | — | — | 0.13 | — | — | — | — | 0.06 |

TABLE 10

| | CHEMICAL COMPOSITION OF FLUX (wt %) | | | | Al₂O₃ + SiO₂ | A: (ZrO₂ +Al₂O₃)/SiO₂ |
|---|---|---|---|---|---|---|
| No | MgO | CaO | MnO | OTHER | | |
| COMP. | | | | | | |
| 16 | — | — | — | 0.06 | 0.60 | 2.2 |
| 17 | — | — | — | 0.08 | 0.32 | 78.7 |
| 18 | — | — | — | 0.05 | 3.06 | 2.8 |
| 19 | — | — | — | 0.05 | 2.02 | 0.5 |
| 20 | — | — | — | 0.05 | 0.17 | 25.3 |
| 21 | — | — | — | 0.07 | 1.81 | 9.6 |
| 22 | — | — | — | 0.06 | 0.86 | 3.0 |
| 23 | — | — | — | 0.04 | 1.03 | 7.0 |
| 24 | — | — | — | 0.04 | 0.82 | 4.0 |
| 25 | — | — | — | 0.04 | 0.80 | 4.4 |

TABLE 11

| | CHEMICAL COMPOSITION OF WIRE (wt %) | | | | | | | F/(N + 3 (V + Nb)) |
|---|---|---|---|---|---|---|---|---|
| No | N | V | Nb | V + Nb | Cr | Ni | Mo | |
| COMP. | | | | | | | | |
| 16 | 0.12 | 0.12 | 0.18 | 0.30 | 18.44 | 8.34 | 0.25 | 0.08 |
| 17 | 0.04 | — | — | — | 18.03 | 11.23 | 2.36 | 3.50 |
| 18 | 0.07 | — | — | — | 18.44 | 8.24 | 0.02 | 2.00 |
| 19 | 0.10 | — | — | — | 22.34 | 8.46 | 2.69 | 1.60 |
| 20 | 0.11 | 0.02 | 0.08 | 0.10 | 19.34 | 8.56 | 0.12 | 0.71 |
| 21 | 0.09 | 0.02 | 0.08 | 0.10 | 17.99 | 11.43 | 2.98 | 0.03 |
| 22 | 0.07 | — | — | — | 21.54 | 8.98 | 2.31 | 11.30 |
| 23 | 0.12 | 0.13 | 0.19 | 0.32 | 20.89 | 8.34 | 2.54 | 0.10 |
| 24 | 0.12 | 0.12 | 0.f8 | 0.30 | 18.41 | 8.56 | 0.23 | 0.10 |
| 25 | 0.31 | 0.12 | 0.18 | 0.30 | 22.65 | 8.23 | 2.54 | 0.05 |

TABLE 12

| | WORKABILITY IN WELDING | | | | |
|---|---|---|---|---|---|
| No | ARC STABILITY | GENERATION AMOUNT | SLAG REMOVING CHAR. | SLAG COVERING ABILITY | BEAD SHEPE |
| EXAMPLES | | | | | |
| 1 | ⊙ | ⊙ | ⊙ | ⊙ | ⊙ |
| 2 | ⊙ | ⊙ | ⊙ | ⊙ | ⊙ |
| 3 | ⊙ | ⊙ | ⊙ | ⊙ | ⊙ |
| 4 | ⊙ | ⊙ | ⊙ | ⊙ | ⊙ |
| 5 | ⊙ | ⊙ | ⊙ | ⊙ | ○ |
| 6 | ⊙ | ⊙ | ⊙ | ⊙ | ⊙ |
| 7 | ○ | ○ | ⊙ | ⊙ | ⊙ |
| 8 | ⊙ | ⊙ | ○ | ⊙ | ⊙ |
| 9 | ⊙ | ⊙ | ⊙ | ⊙ | ⊙ |
| 10 | ⊙ | ⊙ | ⊙ | ⊙ | ⊙ |
| 11 | ⊙ | ⊙ | ⊙ | ⊙ | ⊙ |
| 12 | ○ | ○ | ⊙ | ⊙ | ⊙ |

TABLE 12-continued

<table>
<tr><th rowspan="2">No</th><th colspan="5">WORKABILITY IN WELDING</th></tr>
<tr><th>ARC STABILITY</th><th>GENERATION AMOUNT</th><th>SLAG REMOVING CHAR.</th><th>SLAG COVERING ABILITY</th><th>BEAD SHEPE</th></tr>
<tr><td>13</td><td>⊚</td><td>⊚</td><td>⊚</td><td>⊚</td><td>⊚</td></tr>
<tr><td>14</td><td>○</td><td>○</td><td>⊚</td><td>○</td><td>⊚</td></tr>
<tr><td>15</td><td>⊚</td><td>⊚</td><td>⊚</td><td>⊚</td><td>⊚</td></tr>
</table>

TABLE 13

<table>
<tr><th rowspan="2">No</th><th colspan="5">WORKABILITY IN WELDING</th></tr>
<tr><th>ARC STABILITY</th><th>SPATTER GENERATION AMOUNT</th><th>SLAG REMOVING CHAR.</th><th>SLAG COVERING ABILITY</th><th>BEAD SHEPE</th></tr>
<tr><td colspan="6">EXAMPLES</td></tr>
<tr><td>16</td><td>x</td><td>○</td><td>x</td><td>○</td><td>○</td></tr>
<tr><td>17</td><td>⊚</td><td>○</td><td>⊚</td><td>x</td><td>x</td></tr>
<tr><td>18</td><td>○</td><td>○</td><td>x</td><td>x</td><td>x</td></tr>
<tr><td>19</td><td>○</td><td>○</td><td>x</td><td>○</td><td>x</td></tr>
<tr><td>20</td><td>○</td><td>○</td><td>⊚</td><td>x</td><td>x</td></tr>
<tr><td>21</td><td>○</td><td>○</td><td>x</td><td>○</td><td>○</td></tr>
<tr><td>22</td><td>x</td><td>x</td><td>⊚</td><td>x</td><td>x</td></tr>
<tr><td>23</td><td>x</td><td>x</td><td>○</td><td>○</td><td>○</td></tr>
<tr><td>24</td><td>○</td><td>x</td><td>x</td><td>○</td><td>○</td></tr>
<tr><td>25</td><td>○</td><td>x</td><td>x</td><td>○</td><td>○</td></tr>
</table>

As shown in the foregoing tables 4 to 13, since the examples of Nos. 1 to 15 has chemical compositions in the flux and chemical compositions in the wire in the present invention, being fixed in the value range defined as set forth above, superior effects in any items of workability in welding in comparison with the comparative examples could be obtained. Particularly, all of the examples except for the example No. 5 satisfy the foregoing formula $(A=([ZrO_2]+[Al_2O_3])/[SiO_2])$ and thus demonstrate quite good bead shape. Also, all of the examples except for the example No. 8 satisfy that the content of Nb and V is less than or equal to 0.3 wt % in total weight with respect to total weight of the wire and the formula $([F]/([N]+3\times([Nb]+[V])))$ is greater than or equal to 0.2, quite good slag removing characteristics could be obtained.

On the other hand, since the comparative example No. 16 contains $TiO_2$ in the content exceeding the upper limit of the range defined by the present invention, arc stability and slag removing characteristics were lowered. The comparative example No. 17 contains $SiO_2$ in the content less than the lower limit of the range defined by the present invention to show low slag coverage and intimacy of the bead. Particularly, in the vertical position upward welding and wire moving method was straight, bead became convex shaped configuration. The comparative example No. 18 contains $TiO_2$ in the content less than the lower limit of the range defined by the present invention to cause lowering of the slag coverage. Also, since the contents of $Al_2O_3$ and $Al_2O_3 + SiO_2$ exceeded the upper limits of the ranges defined by the present invention, slag removing characteristics was significantly lowered and bead shape was degraded.

The comparative example No. 19 contains $SiO_2$ exceeding the upper limit of the range defined by the present invention to cause lowering of slag removing characteristics. Also, since $ZrO_2$ content is less than the lower limit of the range defined by the present invention, the bead shape became no good. Particularly in overhead position welding, the bead drooped to make welding difficult. The comparative example No. 20 has $Al_2O_3$ content less than the lower limit defined by the present invention to cause lowering of slag coverage, and the bead became convex shaped configuration and thus was no good. The comparative example No. 21 contains converted value of F less than the lower limit of the range defined by the present invention to cause extremely lowering the slag removing characteristics. The comparative example No. 22 contains converted value of F greater than the upper limit of the range defined by the present invention to make the slag to easily flow and to make the bead shape in vertical position and overhead position welding no good. Also, arc became unstable, and spatter generation amount was increased.

The comparative example No. 23 contains $ZrO_2$ in the content exceeding the upper limit of the range defined by the present invention to accelerate solidification of the slag. In the vertical position welding, the slag covered a molten pool up to the position in the vicinity of arc point. Accordingly, arc became unstable, and spatter generation amount was increased to make welding difficult. The comparative example Nos. 24 and 25 contained metal carbonate or nitrogen content in the wire exceeding the ranges defined by the present invention to cause increasing of generation amount of spatter, and slag removing characteristics was lowered.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A high nitrogen flux cored wire for all position welding of Cr—Ni type stainless steel, which is formed by filling a flux within a stainless steel sheath, containing:

N (converted value of N): 0.05 to 0.30 wt %, with respect to total weight of the wire, in said sheath and said flux; and $TiO_2$: 4.0 to 8.0 wt %; $ZrO_2$: 0.5 to 4.0 wt %; $SiO_2$: 0.05 to 1.5 wt %; $Al_2O_3$: 0.05 to 1.5 wt %; Metal fluoride (converted value of F): 0.02 to 0.7 wt %; and Metal carbonate: less than or equal to 10 wt %; a content of $Al_2O_3$ and $SiO_2$ in total being restricted to be less than or equal to 2.5 wt %, with respect to total weight of the wire, in the flux.

2. A high nitrogen flux cored wire for all position welding of Cr—Ni type stainless steel, which is formed by filling a flux within a stainless steel sheath, containing:

N (converted value of N): 0.05 to 0.30 wt %, with respect to total weight of the wire, in said sheath and said flux; and $TiO_2$: 4.0 to 8.0 wt %; $ZrO_2$: 0.5 to 4.0 wt %; $SiO_2$: 0.05 to 1.5 wt %; $Al_2O_3$: 0.05 to 1.5 wt %; and Metal fluoride (converted value of F): 0.02 to 0.7 wt %; a content of $Al_2O_3$ and $SiO_2$ in total being restricted to be less than or equal to 2.5 wt %, and metal carbonate as an impurity being restricted to be less than or equal to 1.0 wt %, with respect to total weight of the wire, in the flux.

3. A high nitrogen flux cored wire for all position welding of Cr—Ni type stainless steel as set forth in claim 1 or 2, wherein, assuming that contents of $ZrO_2$, $Al_2O_3$ and $SiO_2$ in the flux with respect to the total amount of said wire are respectively $[ZrO_2]$, $[Al_2O_3]$ and $[SiO_2]$, a value A derived from an equation $(A=([ZrO_2]+[Al_2O_3])/[SiO_2])$ being greater than or equal to 0.7.

4. The flux cored wire of claim 3, wherein said value A is greater than or equal to 2.5.

5. A high nitrogen flux cored wire as set forth in claim 1 or 2, wherein a total amount of contents of Nb and V in the sheath and flux is restricted to be less than or equal to 0.3 wt % with respect to total weight of the wire, and assuming the content of metal fluoride in converted value of F, the content of N and nitrogen compound in converted value of N, and contents of Nb and V, with respect to total weight of the wire are respectively [F], [N], [Nb] and [V], a value calculated from $([F]/([N]+3\times([Nb]+[V])))$ is greater than or equal to 0.2.

6. The flux cored wire of claim 1, consisting essentially of:

said N, in said sheath and said flux; and said $TiO_2$; said $ZrO_2$; said $SiO_2$; said $Al_2O_3$; said metal fluoride; and said metal carbonate; in said flux.

7. A method of making the flux cored wire of claim 6, comprising:

filling said stainless steel sheath with said flux.

8. The flux cored wire of claim 1, further containing at least one member selected from the group consisting of Ni, Cr, Mo, Si, Mn and Mg.

9. A method of making the flux cored wire of claim 1, comprising:

filling said stainless steel sheath with said flux.

10. The flux cored wire of claim 2, consisting essential of:

said N, in said sheath and said flux; and said $TiO_2$; said $ZrO_2$; said $SiO_2$; said $Al_2O_3$; and said metal fluoride; in said flux.

11. A method of making the flux cored wire of claim 10, comprising:

filling said stainless steel sheath with said flux.

12. The flux cored wire of claim 2, further containing at least one member selected from the group consisting of Ni, Cr, Mo, Si, Mn and Mg.

13. A method of making the flux cored wire of claim 2, comprising:

filling said stainless steel sheath with said flux.

* * * * *